United States Patent Office 3,449,427
Patented June 10, 1969

3,449,427
AMINOCYCLOPROPANE DERIVATIVES OF
5H-DIBENZO[a,d]CYCLOHEPTENES
Carl Kaiser, Haddon Heights, N.J., and Charles L. Zirkle,
Berwin, Pa., assignors to Smith Kline & French Laboratories, Philadelphia, Pa., a corporation of Pennsylvania
No Drawing. Filed June 3, 1965, Ser. No. 461,176
Int. Cl. C07c 87/28, 91/16, 149/42
U.S. Cl. 260—570.8                8 Claims

ABSTRACT OF THE DISCLOSURE

5[2-(N-N di substituted amino) cyclopropyl]-10,11-dihydro 5H dibenzo[a,d]cycloheptanes are prepared via the amides and acids. The compounds are antidepressants, transquillizers and anorectics.

This invention relates to novel aminocyclopropane derivatives of 5H-dibenzo[a,d]cycloheptenes having useful pharmacodynamic activity. More specifically, the compounds of this invention have central nervous system activity such as antidepressant, tranquilizing and anorectic activity.

The novel aminocyclopropane derivatives of this invention may be represented by the following general structural formula:

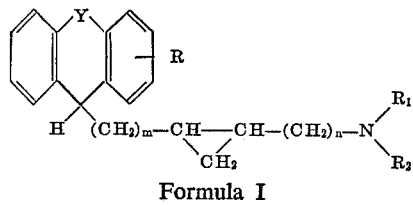

Formula I in which:
Y represents $CH_2CH_2$ or $CH=CH$, preferably $CH_2CH_2$;
R represents hydrogen, chlorine, bromine, trifluoromethyl, methyl, methoxy or methylthio, preferably in the 3-position of hte dibenzocycloheptene ring;
m and n each represent an integer from 0 to 1; and
$R_1$ and $R_2$ each represent hydrogen, lower alkyl of from 1 to 3 carbon atoms or when taken toegther with the nitrogen atom to which they are attached, represent a pyrrolidine, piperidine, N'-methylpiperazine, N'-($\beta$-hydroxyethyl)-piperazine or N'-($\beta$-acetoxyethyl)-piperazine ring.

Preferred compounds of this invention are represented by the above Fomula I when m is 0 and n is 1.

The nontoxic pharmaceutically acceptable acid addition salts of the compounds of Formula I are also included within the scope of this invention. Both organic and inorganic acids can be employed to form such salts, illustrative acids being sulfuric, nitric, phosphoric, hydrochloric, citric, acetic, lactic, tartaric, pamoic, ethanedisulfonic, sulfamic, succinic, cylohexylsulfamic, fumaric, maleic, benzoic and the like. These salts are readily prepared by methods known to the art.

The compounds of this invention may be present as cis-trans isomers due to the geometrical arrangement of the dibenzocycloheptene substituent and the amino moiety with respect to the cyclopropane ring and further as d, l optical isomers. Unless otherwise specified in the description and accompanying claims, it is intended to include all isomers, whether separated or mixtures thereof.

The novel aminocyclopropane derivatives of 5H-dibenzo[a,d]cycloheptenes of this invention are prepared by several methods, the choice of which depending on the definitions of m, n, $R_1$ and $R_2$. The starting materials for these methods are generally 5H-dibenzo[a,d]cycloheptenes having the formula:

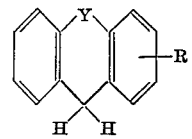

Formula II in which Y and R are as defined in Formula I. These compounds are prepared by reduction of the corresponding 5H-dibenzo[a,d]cyclohepten-5-ones with, for example, sodium in a lower alkanol, preferably, ethanol or by the Wolff-Kishner method.

In one method of preparation of the aminocyclopropanes of this invention from the dibenzocycloheptenes of Formula II, the dibenzocycloheptene is alkylated with, for example, ethyl 2-bromo- or 2-bromoethyl-cyclopropanecarboxylate followed by hydrolysis to give the corresponding cyclopropanecarboxylic acids having the formula:

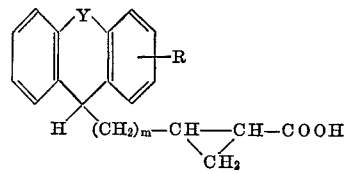

Formula III in which Y and R are as defined in Formula I and m is 0 or 1. The useful compounds of Formula III are converted to amino compounds of this invention by several routes. Reaction of the acid with a lower alkyl haloformate gives the corresponding cyclopropyl mixed anhydride which is then treated with sodium azide to give the cyclopropyl azide. The acid azide is then thermally decomposed by heating in an inert organic solvent to give the corresponding isocyanate. The resulting isocyanate is converted to aminocyclopropanes of Formula I where n is 0 by: (a) hydrolysis with a mineral acid such as hydrochloric acid or an alkali metal hydroxide such as sodium or potassium hydroxide at elevated temperatures to give the primary aminocyclopropane or (b) reaction with a lower alkyl magnesium halide or lower alkanol to give an N-lower acyl or N-lower carbalkoxy aminocyclopropane, respectively, which is either reduced directly with, for example, lithium aluminum hydride to give an N-lower aminocyclopropane or further reacted with a lower alkyl iodide to give an N-lower alkyl-N-lower acyl or N-lower alkyl-N-lower carbalkoxy aminocyclopropane, respectively, which is reduced with, for example, lithium aluminum hydride to give an N,N-dialkylaminocyclopropane.

These reactions may be summarized as follows where Y and R are as defined in Formula I, $m$ is 0 or 1 and $R_1$ and $R_2$ are lower alkyl:

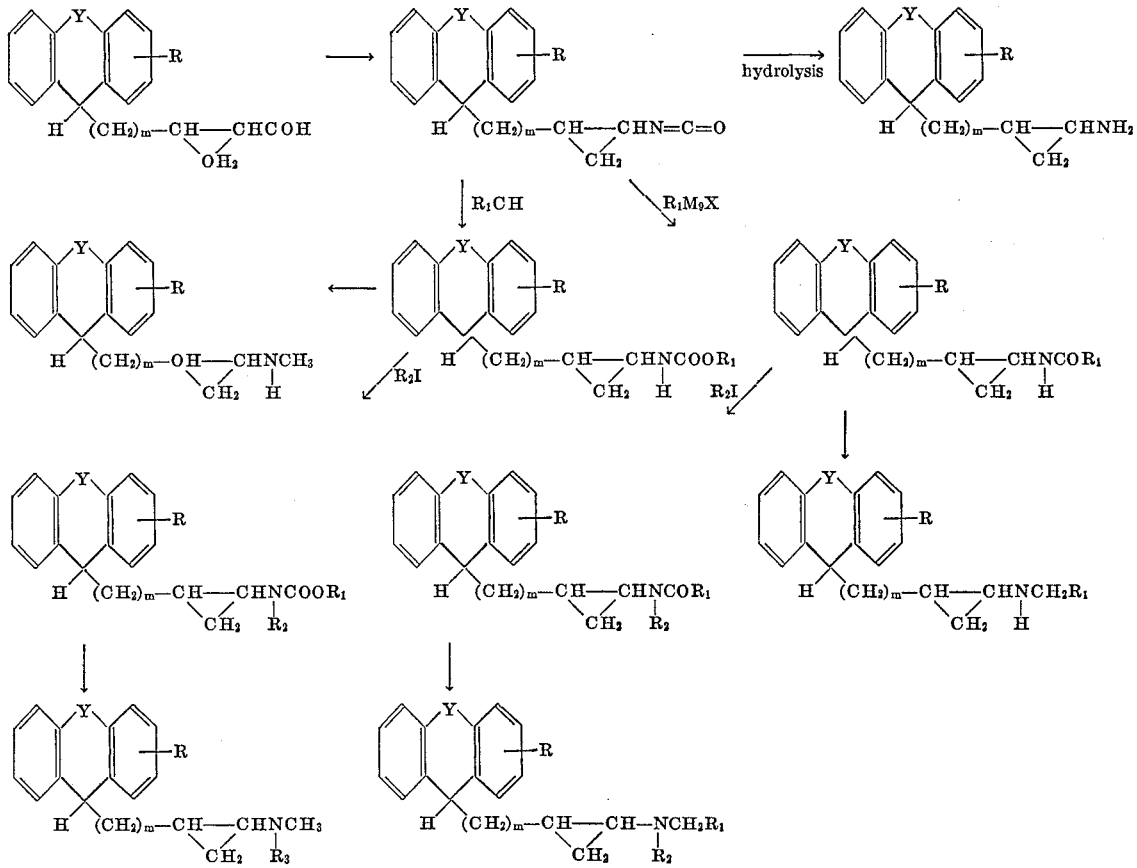

To prepare the aminocylopropanes of Formula I where $m$ is 0 and $n$ is 1, a dibenzocycloheptene of Formula II is advantageously alkylated with 2-bromocyclopropanecarboxamide to form the carboxamide derivative which is reduced with, for example, lithium aluminum hydride to give the corresponding aminomethylcyclopropanes as follows:

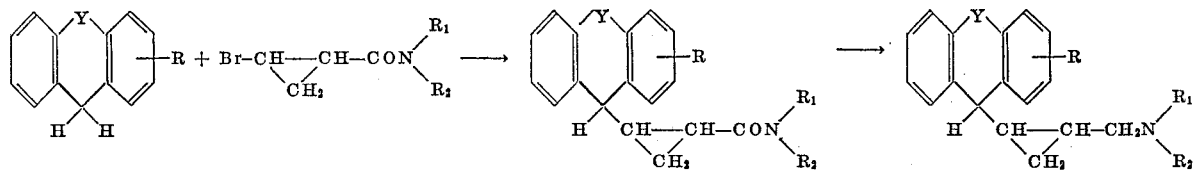

in which Y and R are as defined in Formula I, $R_1$ is hydrogen or lower alkyl, and $R_2$ is lower alkyl or when $R_1$ and $R_2$ are taken together with the nitrogen atom to which they are attached, represent a pyrrolidine, piperidine or N'-methylpiperazine ring. The 2-bromocyclopropanecarboxamides are readily prepared from the corresponding carboxylic esters by hydrolysis, conversion to the acid chloride, and treatment with a secondary amine.

Alternatively, the aminocyclopropanes of Formula I where $n$ is 1 are prepared from the cyclopropanecarboxylic acids of Formula III by reacting the acid with a lower alkyl haloformate to give the corresponding cyclopropyl mixed anhydride which is then treated with ammonia, a monoalkyl amine, a dialkylamine or a heterocyclic amine to give the cyclopropanecarboxamide. Reduction of the amide with, for example, lithium aluminum hydride gives the corresponding aminomethylcyclopropanes.

The novel aminocyclopropanes of this invention represented by Formula I above where $m$ and $n$ are 1 are prepared by alkylation of the dibenzocycloheptenes of Formula II with an active ester derivative of aminocyclopropyl carbinols, for example, a p-toluenesulfonate derivative. These useful carbinol intermediates having the formula:

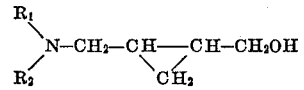

Formula IV in which $R_1$ and $R_2$ are lower alkyl or when taken together with the nitrogen atom to which they are attached, represent a pyrrolidine, piperidine or N'-methylpiperazine ring are prepared by reaction of, for example, ethyl γ-bromocrotonate with an appropriate dialkylamine or heterocyclic amine to give the corresponding aminocrotonate which is then reacted with a reagent formed from trimethylsulfoxonium iodide. The latter in the presence of a strong base such as sodium hydride forms a reactive substance called dimethylsulfoxonium methylide,

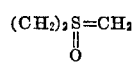

which produces the ethyl aminocyclopropylcarboxylate. Similar reduction of the carboxylate with, for example, lithium aluminum hydride gives the aminocyclopropyl carbinols of Formula IV where $n$ is 1.

The aminocyclopropyl carbinols of Formula IV above are advantageously employed in the dibenzocycloheptene alkylation as the tosylates. Thus, reaction of the aminomethylcyclopropyl carbinol tosylate with the appropriate dibenzocycloheptene gives the desired product.

The compounds of Formula I above where $R_1$ and $R_2$ together represent a heterocyclic amino moiety are prepared also from the corresponding primary amines. The pyrrolidinyl and piperidinyl derivatives are prepared from the primary amine and 1,4-dibromobutane and 1,5-dibromopentane, respectively in an organic solvent refluxing at a temperature from 100–150° C. and in the presence of potassium carbonate. Similar reaction of the primary amine with methyl bis-($\beta$-chloroethyl)-amine gives the N'-methylpiperazinyl derivative.

In the above described preparation methods, when the first step of the reaction sequence consists of alkylation of a dibenzocycloheptene with an ethyl 2-bromomethylcyclopropanecarboxylate or a carbinol intermediate of Formula IV, both the cis and trans products are obtained depending on the stereochemistry of the alkylating agent. However, when an ethyl 2-bromocyclopropanecarboxylate or a 2-bromocyclopropanecarboxamide is employed, the more stable trans products are obtained.

To prepare the cis as well as trans aminocyclopropane derivatives of dibenzocycloheptene of Formula I in which $m$ is 0 and $n$ is 0 or 1, and $Y=CH_2CH_2$, an appropriate 5-vinyldibenzocycloheptene is reacted with ethyl diazoacetate to give a mixture of cis- and trans-dibenzocycloheptenyl cyclopropanecarboxylates. This mixture is selectively hydrolyzed with alkali to give the trans-acid and unhydrolyzed cis-ester. Subsequent hydrolysis of the cis-ester with excess alkali affords the cis-acid. Both isomeric acids are thus available for further reaction as described hereinabove. The 5-vinyldibenzocycloheptenes are conveniently prepared via Hofmann degradation of corresponding 5 - dimethylaminoethyl-5H-dibenzo[a,d]cycloheptene methiodides.

The novel compounds of this invention may be administered orally or parenterally in conventional dosage forms such as tablets, capsules, injectables or the like, by incorporating the appropriate dose of a compound of Formula I with carriers according to accepted pharmaceutical practices.

The foregoing is a general description of the main synthetic routes in the preparation of the aminocyclopropanes of this invention. It will be readily apparent to one skilled in the art that variations of these procedures are possible. The following examples illustrate these procedures but should not be construed as limiting the invention to the specific compounds prepared thereby. Where the examples specify reaction of a trans compound, the corresponding cis isomer can of course be similarly employed.

EXAMPLE 1

To a stirred solution of 4.0 g. of 10,11-dihydro-5H-dibenzo[a,d]cycloheptene (prepared by sodium and ethanol reduction of the corresponding 5-one) in 50 ml. of dimethylsulfoxide is added, in portions, 0.95 g. of 52% dispersion of sodium hydride in mineral oil. The mixture is heated at 60–70° C. for 20 minutes, then cooled to 20° C. and a solution of 4.0 g. of 2-bromo-N,N-dimethylcyclopropanecarboxamide in 20 ml. of dimethylsulfoxide is added dropwise. The resulting mixture is heated at 100° C. for one hour, cooled, diluted with 500 ml. of ice-water and extracted with ether. The extract is dried and concentrated to give trans-5-[2-(N,N-dimethylcarboxamido)-cyclopropyl] - 10,11 - dihydro - 5H - dibenzo[a,d]cycloheptene.

A solution of this amide in 50 ml. of dry ether is added dropwise to a stirred suspension of 1.6 g. of lithium aluminum hydride in 150 ml. of ether. The mixture is stirred and refluxed for four hours. To the cooled reaction mixture is added dropwise 1.6 ml. of water followed by 1.6 ml. of 10% aqueous sodium hydroxide and an additional 4.8 ml. of water. The resulting mixture is filtered and the filtrate extracted with aqueous acetic acid. The acid extract is made alkaline with dilute sodium hydroxide solution and the mixture extracted with ether. The dried ether extract is concentrated to give trans-5-[2-(N,N - dimethylaminomethyl) - cyclopropyl] - 10,11-dihydro-5H-dibenzo[a,d]cycloheptene.

Similarly, by employing in the above reaction sequence 4.2 g. of 3-methyl-10,11-dihydro-5H-dibenzo[a,d]cycloheptene (prepared by sodium and ethanol reduction of the corresponding 5-one) there is obtained as the final product trans - 3 - methyl - 5[2 - (N,N - dimethylaminomethyl)-cyclopropyl]-10,11-dihydro-5H-dibenzo[a,d]cycloheptene.

EXAMPLE 2

To a stirred mixture of 115 g. of 3-chloro-10,11-dihydro-5H-dibenzo[a,d]cycloheptene (prepared by sodium and ethanol reduction of the corresponding 5-one) in 500 ml. of dry toluene is added, under nitrogen, 21.5 g. of sodium amide. The mixture is stirred and refluxed for two hours, the heat is removed and a solution of dimethylaminoethyl chloride in toluene is added dropwise. The latter is prepared by dissolving 144 g. of dimethylaminoethyl chloride hydrochloride in a minimum volume of water, adding with cooling excess 40% sodium hydroxide solution, saturating the mixture with sodium carbonate and extracting with toluene.

The reaction mixture is stirred and refluxed for two hours, cooled and then treated with 25 ml. of ethanol followed by 250 ml. of water, the latter added slowly. The separated organic layer is dried and concentrated in vacuo. The residue is distilled to give 3-chloro-5-(2-dimethylaminoethyl)-10,11-dihydro-5H-dibenzo[a,d]cycloheptene.

To a stirred solution of 125 g. of the above dibenzocycloheptene in 1.2 l. of acetone is added dropwise a solution of 71 g. of methyl iodide in 200 ml. of acetone. The reaction mixture is stirred at room temperature for one hour and then filtered to give the corresponding methiodide.

A suspension of anion exchange resin (hydroxide form) is washed several times with methanol, then suspended in 500 ml. of methanol and 73.5 g. of the above dibenzocycloheptene methiodide suspended in 150 ml. of methanol is added. The mixture is stirred at room temperature for one hour, filtered and the resin cake is washed with methanol. The filtrates are concentrated in vacuo and the residue (the corresponding dibenzocycloheptene methyl hydroxide) is heated on a steam bath in vacuo until gas evolution is complete. The residue is taken up into ether and the solvent removed in vacuo to give 3 - chloro - 5 - vinyl - 10,11 - dihydro - 5H - dibenzo[a,d]cycloheptene.

To a refluxing mixture of 2 g. of anhydrous cupric sulfate powder and 100 ml. of dry benzene is added, dropwise with stirring, a solution of 47.0 g. of the above 5-vinyl dibenzocycloheptene and 27.4 g. of ethyl diazoacetate in 150 ml. of dry benzene. After addition is complete, the mixture is refluxed for 30 minutes, filtered and the filtrate concentrated in vacuo to give the residual 3 - chloro - 5 - (2 - carbethoxycyclopropyl) - 10,11 - dihydro-5H-dibenzo[a,d]cycloheptene.

To a stirred solution of the above carbethoxycyclopropyl derivative (34.1 g., 0.1 mole) in 200 ml. of ethanol at 0° is added a solution of 3.9 g. (0.07 mole) of potassium hydroxide in 20 ml. of water. The mixture is stirred at room temperature for 1 hr. then it is refluxed for two hours and concentrated in vacuo. The residue is diluted with water and extracted with ether. This ether solution contains the cis-ester. The aqueous layer is acidified with acetic acid (pH 6) and extracted with ether. The ether extract is dried and concentrated in vacuo to give, after crystallization from ethyl acetate-hexane, trans-3-chloro-5 - (2 - carboxycyclopropyl) - 10,11 - dihydro - 5H - dibenzo[a,d]cycloheptene.

The above ether solution of cis-ester is dried and concentrated. The residual oily ester is hydrolyzed with excess aqueous-ethanolic potassium hydroxide in an analogous manner to give cis-3-chloro-5-(2-carboxycyclopropyl)-10,11-dihydro-5H-dibenzo[a,d]cycloheptene.

To a solution of 6.2 g. of the above trans carboxycyclopropyl derivative in 60 ml. of acetone, cooled to 0° C. is added 4.7 ml. of triethylamine in acetone and 3.2 ml. of ethyl chloroformate. The mixture is stirred for 15 minutes and then a solution of 2.6 g. of sodium azide in water is added. After stirring for 30 minutes, the reaction mixture is poured into ice-water and extracted with toluene. The dried extract is heated on the steam bath to decompose the acid azide. Removal of the solvent gives the residual transcyclopropyl isocyanate derivative.

To a stirred mixture of 50 ml. of 3 M methyl magnesium bromide in ether is added 7.1 g. of the above isocyanate in ether. The mixture is refluxed for two hours, cooled and 200 ml. of 10% hydrochloric acid solution is added slowly. The separated aqueous layer is extracted with ether. Concentration of the organic solutions gives the trans-3-chloro-5-[2-(N-acetylamino)-cyclopropyl]-10,11-dihydro-5H-dibenzo[a,d]cycloheptene.

To a solution of 7.4 g. of the above N-acetylaminocyclopropyl derivative in 70 ml. of tetrahydrofuran is added 1.0 g. of 53.5% sodium hydride and the mixture is stirred and refluxed for one hour. A solution of 8 ml. of ethyl iodide in 25 ml. of tetrahydrofuran is added to the cooled reaction mixture which is then refluxed for four hours. An additional 8 ml. of ethyl iodide in 10 ml. of tetrahydrofuran is added and refluxing continued for 12 hours. The reaction mixture is filtered and the filtrate concentrated in vacuo. The residue is taken up in water and ether, extracted with ether and the dried solvent removed to give trans-3-chloro-5-[2-(N-acetyl-N-ethylamino)-cyclopropyl]-10,11-dihydro-5H-dibenzo[a,d]cycloheptene.

A solution of the above N-acetyl-N-ethylaminocyclopropyl derivative (7.9 g.) in ether is added to a suspension of 5.0 g. of lithium aluminum hydride in ether and the mixture stirred and refluxed for six hours. Decomposition of the metal complex yields an oil which is treated in acetone solution with ethereal hydrogen chloride to give trans-3-chloro-5-[2-(N,N-diethylamino-cyclopropyl]-10,11-dihydro-5H-dibenzo[a,d]cycloheptene hydrochloride.

Direct hydrolysis of the above transcyclopropyl isocyanate derivative in concentrated hydrochloric acid at reflux for 12 hours yields upon workup trans-3-chloro-5-(2-aminocyclopropyl)-10,11-dihydro-5H-dibenzo[a,d]cycloheptene.

EXAMPLE 3

To a solution of 6.6 g. of 3-trifluoromethyl-10,11-dihydro-5H-dibenzo[a,d]cycloheptene (prepared by sodium and ethanol reduction of the corresponding 5-one) in 20 ml. of dimethylsulfoxide is added in portions 1.2 g. of a 53.5% suspension of sodium hydride in mineral oil, maintaining the temperature below 40° C. A solution of 4.8 g. of ethyl 2-bromocyclopropanecarboxylate in 10 ml. of dimethylsulfoxide is added dropwise and the mixture is heated on the steam bath for one hour. The reaction mixture is poured onto ice/water mixture and extracted with ether. The dried extract is concentrated to give 3-trifluoromethyl-5-(2-carbethoxycyclopropyl)-10,11-dihydro-5H-dibenzo[a,d]cycloheptene.

A mixture of 8.6 g. of the above carbethoxycyclopropyl derivative in 100 ml. of ethanol and 2.6 g. of potassium hydroxide in water is stirred and refluxed for two hours. The alcohol is replaced by water using a trap and the filtered aqueous solution is extracted with ether. Acidification with concentrated hydrochloric acid gives a solid which is taken up in ethyl acetate. This solution is dried and evaporated to give an oil which is crystallized from ethyl acetate-petroleum ether to give trans-3-trifluoromethyl-5-(2-carboxycyclopropyl)-10,11-dihydro-5H-dibenzo[a,d]cycloheptene.

To a mixture of 3.9 g. of the above trans carboxycyclopropyl derivative and 3 ml. of triethylamine, cooled to 0° C., is added 2 ml. of ethyl chloroformate in acetone. The mixture is stirred for 15 minutes and then 4.4 g. of N-(β-hydroxyethyl)piperazine in acetone is added with cooling. After stirring for three hours at room temperature, the reaction mixture is poured into cold water and extracted with ether. The dried extract is evaporated to give trans - 3 - trifluoromethyl - 5 - {2 - [N - (β - hydroxyethyl) - N' - piperazinoyl] - cyclopropyl} - 10,11 - dihydro-5H-dibenzo[a,d]cycloheptene.

To a suspension of 1.0 g. of lithium aluminum hydride in ether is added a suspension of 3.9 g. of the above piperazinyl derivative in ether and the mixture stirred and refluxed for eight hours. After standing overnight at room temperature, the reaction mixture is decomposed, filtered and the filtrate acidified with ethanol-ethereal hydrogen chloride. Addition of excess ether precipitates the solid trans-3-trifluoromethyl-5-{2-[N-(β - hydroxyethyl)-N'-piperazinylmethyl]-cyclopropyl}-10,11-dihydro-5H-dibenzo[a,d]cycloheptene hydrochloride. Acetylation with acetyl chloride yields the corresponding β-acetoxyethyl derivative.

EXAMPLE 4

A solution of 9.8 g. of trans-3-trifluoromethyl-5-(2-carboxycyclopropyl)-10,11-dihydro-5H - dibenzo[a,d]cycloheptene (prepared as in Example 3) in acetone is treated with 7 ml. of triethylamine in acetone. The resulting mixture is cooled to 0° C. and 5 ml. of ethyl chloroformate in acetone is added. After stirring for 20 minutes, a solution of 7.1 g. of dimethylamine in acetone is added and stirring continued for 30 minutes with cooling and then for two hours at room temperature. The reaction mixture is poured into ice-water, extracted with methylene chloride and the dried extract evaporated. The residue is taken up in ether, extracted with 10% sodium hydroxide solution and the dried ether solution evaporated to give the solid trans-3-trifluoromethyl-5-[2-(N,N - dimethylcarboxamido)-cyclopropyl]10,11-dihydro - 5H - dibenzo[a,d]cycloheptene.

To 2.5 g. of lithium aluminum hydride in ether is added a solution of 9.8 g. of the above carboxamido derivative in ether and the mixture is stirred and refluxed for eight hours. After standing at room temperature overnight, the reaction mixture is decomposed, filtered and the filtrate evaporated. The residue is taken up in ethanol and treated with ethereal hydrogen chloride. Addition of excess ether precipitates the solid trans-3-trifluoromethyl-5-[2-(N,N-dimethylaminomethyl)-cyclopropyl]-10,11 - dihydro-5H-dibenzo[a,d]cycloheptene hydrochloride.

Similarly, by employing 11 g. of pyrrolidine instead of dimethylamine in the above reaction sequence with subsequent reduction by 2.5 g. of lithium aluminum hydride there is obtained trans-3-trifluoromethyl-5-[2-(N-pyrrolidinylmethyl)-cyclopropyl]-10,11-dihydro-5H - dibenzo[a,d]cycloheptene.

EXAMPLE 5

To a stirred solution of 49.6 g. of piperidine in 170 ml. of dry benzene is added dropwise during ten minutes, 56.1 g. of ethyl 4-bromocrotonate. The mixture is stirred and refluxed for one hour, cooled and filtered. After washing the filter cake with ether, the combined organic filtrates are washed with water, dried and concentrated to give ethyl 4-(N-piperidinyl)-crotonate, B.P. 95–99° C./0.4 mm.

To a stirred suspension of 102.5 g. of trimethylsulfoxonium iodide in 500 ml. of dimethylsulfoxide is added in portions, maintaining the temperature below 35° C., 13.0 g. of sodium hydride (53.5% suspension in mineral oil). After hydrogen evolution is completed, 31.6 g. of ethyl 4-(N-piperidinyl)-crotonate is added dropwise at 25° C. The mixture is stirred at 25° C. for one hour, at 60° C. for two hours, then poured into 2 l. of ice-water and extracted with ether. The ether solution is extracted with 5% hydrochloric acid solution and the acid extract made alkaline with sodium hydroxide solution. This mixture is extracted with ether, the extract dried and concentrated in vacuo to give ethyl trans-2-(N-piperidinyl-methyl)-cyclopropanecarboxylate, B.P. 112–114.5° C./3.5 mm.

A solution of 21.1 g. of the above carboxylate in 100 ml. of ether is added dropwise to a stirred suspension of 3.8 g. of lithium aluminum hydride in 300 ml. of dry ether and the mixture is refluxed for 30 minutes. Then is added successively, 4 ml. of water, 4 ml. of 10% aqueous sodium hydroxide and 12 ml. of water. The mixture is filtered and the filter cake is washed thoroughly with methylene chloride. The combined organic filtrates are dried and concentrated to give 2-hydroxymethyl-1-(N-piperidinylmethyl)-cyclopropane.

To a suspension of 4.5 g. of sodium hydride (53.5% suspension in mineral oil) in 100 ml. of dry tetrahydrofuran is added dropwise 16.9 g. of the above cyclopropane in 30 ml. of tetrahydrofuran. The mixture is stirred at 25° C. The reaction mixture is filtered to give a solution of 2-hydroxymethyl-1-(N-piperidinylmethyl)-cyclopropane, p-toluenesulfonate in tetrahydrofuran which may be used directly in the following alkylation step or isolated as a p-toluenesulfonate salt by treatment of the tetrahydrofuran solution with p-toluenesulfonic acid, concentration and recrystallization of the residue.

A solution of 19.2 g. of 5H-dibenzo[a,d]cycloheptene in 100 ml. of dimethylsulfoxide is added slowly to a suspension of 4.5 g. of sodium hydride (53.5% dispersion in mineral oil) in 100 ml of dimethylsulfoxide at 20–25° C. After hydrogen evolution is completed, a solution of 32.3 g. of 2-hydroxymethyl-1-(N-piperidinylmethyl)-cyclopropane, p-toluenesulfonate in 160 ml. of tetrahydrofuran is added dropwise. The mixture is stirred and refluxed for one hour, poured into 1 l. of ice-water and extracted with ether. The extract is washed with water, dried and concentrated to give trans-5-[2-(N-piperidinylmethyl) - cyclopropylmethyl]-5H-dibenzo[a,d]cycloheptene.

EXAMPLE 6

To a suspension of 4 g. of lithium aluminum hydride in ether is added a solution of 10 g. of trans-3-chloro-5-[2-(N-acetylamino)-cyclopropyl]-10,11-dihydro-5H - dibenzo[a,d]cycloheptene (prepared as described in Example 2) in ether and the mixture stirred and refluxed for eight hours. The reaction mixture is decomposed, filtered and the filtrate evaporated to give trans-3-chloro-5-[2-(N-monoethylamino)-cyclopropyl]-10,11-dihydro[a,d]cycloheptene.

EXAMPLE 7

To a solution of 6.2 g. of cis-3-chloro-5-(2-carboxycyclopropyl)-10,11-dihydro-5H-dibenzo[a,d]cycloheptene (prepared as in Example 2) in 60 ml. of acetone, cooled to 0° C. is added 4.7 ml. of triethylamine in acetone and 3.2 ml. of ethyl chloroformate. The mixture is stirred for 15 minutes and then a solution of 2.6 g. of sodium azide in water is added. After stirring for 30 minutes, the reaction mixture is poured into ice-water and extracted with toluene. The dried extract is heated on the steam bath to decompose the acid azide. Removal of the solvent gives the corresponding cyclopropyl isocyanate derivative.

The above isocyanate is suspended in a large volume of 20% aqueous hydrochloric acid and the mixture is refluxed and stirred for four hours. The resulting solution is made basic and extracted with ether. Evaporation of the ether extract gives cis-3-chloro-5-(2-aminocyclopropyl)-10,11-dihydro-5H-dibenzo[a,d]cycloheptene.

EXAMPLE 8

To a solution of 19.4 g. of 10,11-dihydro-5H-dibenzo[a,d]cycloheptene in 250 ml. of dry toluene is added 4.6 g. of sodium hydride (53.5% dispersion in mineral oil). The mixture is stirred and refluxed for one hour, then it is cooled to 25° and a solution of 20.7 g. of ethyl trans-2-bromomethylcyclopropane-carboxylate in 50 ml. of toluene is added dropwise. The mixture is stirred and refluxed for 8 hours, cooled and diluted with water. Concentration of the dried toluene solution affords trans-5-(2-carbethoxycyclopropylmethyl)-10,11-dihydro-5H-dibenzo[a,d]cycloheptene.

To a solution of the above ester (16.9 g.) in 200 ml. of ethanol is added a solution of 5.6 g. of potassium hydroxide in 10 ml. of water. The solution is heated under refluxe for two hours, concentrated and diluted with water. After extraction of the mixture with ether the aqueous solution is acidified to give trans-5-(2-carboxycyclopropylmethyl)-10,11-dihydro-5H-dibenzo[a,d]cycloheptene.

To a solution of 5.9 g. of the above carboxycyclopropyl derivative in 60 ml. of acetone at 0° C. is added 4.7 ml. of triethylamine in acetone and then 3.2 ml. of ethyl chloroformate. The mixture is stirred for 15 minutes and then a solution of 2.6 g. of sodium azide in water is added. After stirring for 30 minutes, the reaction mixture is poured into ice-water and extracted with toluene. The dried extract is cautiously heated on the steam bath. After nitrogen evolution is completed the solution is concentrated in vacuo to give the trans-cyclopropyl isocyanate derivative.

The above isocyanate is diluted with 50 ml. of ethanol, the solution is refluxed for two hours and concentrated in vacuo to afford an oily carbamate. This carbamate (3.4 g.) is dissolved in 50 ml. of dimethylsulfoxide and 0.46 g. of sodium hydride (53.5% dispersion in mineral oil) is added. The mixture is stirred at 40° C. until hydrogen evolution is completed, then 5 ml. of methyl iodide is added and the mixture is stirred at 50° C. for two hours. The mixture is diluted with ice-water and extracted with ether. The ether extracts are dried and concentrated to give the N-methylcarbamate derivative.

A solution of the above N-methylcarbamate (3.5 g.) in ether is added to a suspension of 2.0 g. of lithium aluminum hydride in ether and the mixture is stirred and refluxed for two hours. Decomposition of the metal complex gives an oil which is treated in ethanol solution with ethereal hydrogen chloride to give trans-5-[2-(N,N-dimethylamino) - cyclopropyl-methyl]-10,11-dihydro-5H-dibenzo[a,d]cycloheptene hydrochloride.

Similarly, 3-methylthio-10,11-dihydro-5H-dibenzo[a,d] cycloheptene (prepared by sodium and ethanol reduction of the corresponding 5-one) yields trans-3-methylthio-5-[2 - (N,N-dimethylamino)cyclopropylmethyl]-10,11-dihydro-5H-dibenzo[a,d]cycloheptene.

EXAMPLE 9

To a solution of 60 g. of 3-chloro-10,11-dihydro-5H-dibenzo[a,d]cycloheptene in 200 ml. of dimethylsulfoxide is added 13 g. of 55.6% sodium hydride in portions, with cooling, and the mixture is stirred for 15 minutes. A solution of 57 g. of ethyl 2-bromocyclopropanecarboxylate in 190 ml. of dimethylsulfoxide is added and the mixture is stirred at room temperature for 45 minutes. After subsequent heating on the steam bath for 30 minutes, the reaction mixture is poured into 2 liters of ice-water, extracted with ether and the dried extract evaporated to give 3 - chloro-5-(2-carbethoxycyclopropyl)-10,11-dihydro-5H-dibenzo[a,d]cycloheptene.

A mixture of 83 g. of the above carbethoxycyclopropyl derivative in 800 ml. of ethanol and 27 g. of potassium hydroxide in water is stirred and refluxed for one hour. After standing at room temperature overnight, the reaction mixture is concentrated in vacuo, diluted with 1 l. of water and extracted with ether. Acidification with concentrated hydrochloric acid solution gives a solid which is trans - 3-chloro-5-(2-carboxycyclopropyl)-10,11-dihydro-5H-dibenzo[a,d]cycloheptene, identical with that prepared by the method of Example 2.

Similarly, by employing ethyl 2-bromomethylcyclopropanecarboxylate in the above reaction sequence followed by hydrolysis yields (trans-3-chloro-5-(2-carboxycyclopropylmethyl)-10,11-dihydro-5H-dibenzo[a,d]cycloheptene.

To a suspension of 25.1 g. of the above trans-3-chloro-5 - (2 - carboxycyclopropyl)-10,11-dihydro-5H-dibenzo[a,d]cycloheptene in 200 ml. of acetone is added 19 ml. of triethylamine in acetone. The mixture is cooled to —5° C., 14 ml. of ethyl chloroformate in acetone is added and stirred for 30 minutes. A solution of 16 g. of dimethylamine in 80 ml. of acetone is added over 45 minutes, maintaining the temperature below 0° C. After 30 minutes the reaction mixture is stirred at room temperature for one hour, then 15 minutes at 40° C. and poured into ice-water. The mixture is extracted with methylene chloride and the dried extract evaporated to give trans - 3 - chloro-5[2-(N,N-dimethylcarboxamido)-cyclopropyl]-10,11-diyhdro-5H-dibenzo[a,d]cycloheptene.

A solution of 30.8 g. of the above carboxamido derivative in 225 ml. of ether is added to a suspension of 8 g. of lithium aluminum hydride in ether and the mixture refluxed for five and one-half hours. The reaction mixture is decomposed, filtered and the filtrate evaporated to give a solid which is dissolved in acetone. Ethereal hydrogen chloride is added to the acetone solution to yield trans-3-chloro - 5 - [2-N,N-dimethylaminomethyl)cyclopropyl]-10,11 - dihydro-5H-dibenzo[a,d]cycloheptene hydrochloride.

Similarly, by employing 33 g. of N-methylpiperazine instead of dimethylamine in the above reaction sequence, the corresponding trans - 3-chloro-5-[2-(N-methyl-N'-piperazinoyl) - cyclopropyl] - 10,11-dihydro-5H-dibenzo[a,d] cycloheptene is obtained which is reduced with 8 g. of lithium aluminum hydride to yield trans-3-chloro-5-[2-(N - methyl-N'-piperazinylmethyl)-cyclopropyl]-10,11-dihydro-5H-dibenzo[a,d]cycloheptene.

EXAMPLE 10

To a suspension of 10.6 g. of trans-3-chloro-5-(2-carboxycyclopropyl) - 10,11-dihydro-5H-dibenzo[a,d]cycloheptene in 60 ml. of acetone is added 8 ml. of triethylamine in acetone, cooled to —5° C., 6 ml. of ethyl chloroformate in acetone is added and the mixture is stirred for 15 minutes in the cold. A solution of 4.4 g. of sodium azide in water is added, stirred for 30 minutes, poured into ice-water and extracted with toluene. The dried extract is heated until gas evolution ceases and then the solvent is removed to give the corresponding trans isocyanate derivative. The latter (12.2 g.) is dissolved in 60 ml. of ethanol and stirred and refluxed for two hours. Removal of the solvent in vacuo gives the ethyl carbamate derivative.

A solution of 11.6 g. of the above carbamate in 50 ml. of dimethylsulfoxide is added to a suspension of 1.4 g. of 55.6% sodium hydride (mineral oil) in 35 ml. of dimethylsulfoxide. The mixture is heated briefly, cooled to 20° C. and 7 ml. of methyl iodide is added, maintaining the temperature between 15–20° C. This mixture is heated at 55–60° C. for 30 minutes, poured into 250 ml. of ice-water, extracted with ether and the dried extract evaporated to give trans-3-chloro-5-[2-methyl-N-carbethoxyamino)-cyclopropyl]-10,11-dihydro - 5H - dibenzo[a,d]cycloheptene.

To a suspension of 2.5 g. of lithium aluminum hydride in ether is added a solution of 11.8 g. of the above N-methyl carbamate derivative in ether and the mixture is refluxed for four hours. The reaction mixture is decomposed, filtered, and the ether removed to give trans-3-chloro-5-[2-(N,N-dimethylamino) - cyclopropyl]-10,11-dihydro-5H-dibenzo[a,d]cycloheptene.

EXAMPLE 11

To a suspension of 2.4 g. of 53.5% sodium hydride in 300 ml. of dimethylsulfoxide is added a solution of 13.7 g. of 3-bromo-5H-dibenzo[a,d]cycloheptene (prepared by sodium and ethanol reduction of the corresponding 5-one) in 50 ml. of dimethylsulfoxide. The mixture is stirred for 30 minutes at 90° C., cooled and 9.7 g. of ethyl 2-bromocyclopropanecarboxylate in 10 ml. of dimethylsulfoxide is added. After stirring for one hour at 90–95° C., the reaction mixture is poured into ice-water, extracted with ether and the dried ether extract evaporated to give 3 - bromo-5-(2-carbethoxycyclopropyl)-5H-dibenzo[a,d]cyclohepene.

A mixture of 12 g. of the above carbethoxycyclopropyl derivative in 100 ml. of ethanol and a solution of 5.6 g. of potassium hydroxide in water is stirred and refluxed for two hours. The solvent is removed in vacuo and the residue is taken up in 175 ml. of water, extracted with ether and the aqueous solution is acidified to give the solid trans - 3 - bromo-5-(2-carboxycyclopropyl)-5H-dibenzo[a,d]cycloheptene.

To a suspension of 30 g. of the above carboxycyclopropyl derivative in 200 ml. of acetone is added 19 ml. of triethylamine in acetone. The mixture is cooled to —5° C., 14 ml. of ethyl chloroformate in acetone is added and stirred for 30 minutes. A solution of 16 g. of dimethylamine in 80 ml. of acetone is added over 45 minutes, maintaining the temperature below 0° C. After 30 minutes the reaction mixture is stirred at room temperature for one hour, then 15 minutes at 40° C. and poured into ice-water. The mixture is extracted with methylene chloride and the dried extract evaporated to give trans-3-bromo-5-[2-(N,N - dimethylcarboxamido)-cyclopropyl]-5H-dibenzo[a,d]cycloheptene.

A solution of 36.8 g. of the above carboxamido derivative in 225 ml. of ether is added to a suspension of 8 g. of lithium aluminum hydride in ether and the mixture refluxed for six hours. The reaction mixture is decomposed, filtered and the filtrate evaporated to give trans-3-bromo-5-[2-(N,N-dimethylaminomethyl) - cyclopropyl]-5H-dibenzo[a,d]cycloheptene.

Similarly, by employing in the above reaction sequence 11.2 g. of 3-methoxy-5H-dibenzo[a,d]cycloheptene (prepared by sodium and ethanol reduction of the corresponding 5-one) or 9.6 g. of 5H-dibenzo[a,d]cycloheptene there is obtained as final products trans-3-methoxy-5-[2-(N,N-dimethylaminoethyl)-cyclopropyl] - 5H - dibenzo[a,d]cycloheptene or trans-5-[2-(N,N-dimethylaminomethyl)-cyclopropyl]-5H-dibenzo[a,d]cycloheptene.

What is claimed is:
1. A chemical compound selected from the group consisting of a free base and salts with pharmaceutically acceptable acids, said free base having the formula:

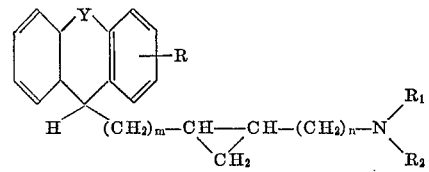

in which:
  Y is a member selected from the group consisting of $CH_2CH_2$ and $CH=CH$;
  R is a member selected from the group consisting of hydrogen, chlorine, bromine, trifluoromethyl, methyl, methoxy and methylthio;
  $m$ and $n$ each represent an integer of from 0 to 1; and
  $R_1$ and $R_2$ are members selected from the group consisting of, when taken individually, hydrogen and lower alkyl of from 1 to 3 carbon atoms, and when taken together with the nitrogen atom to which they are attached, pyrrolidine, piperidine, N'-methylpiperazine, N'-(β-hydroxyethyl)-piperazine and N'-(β-acetoxyethyl)-piperazine ring.

2. A chemical compound of the formula:

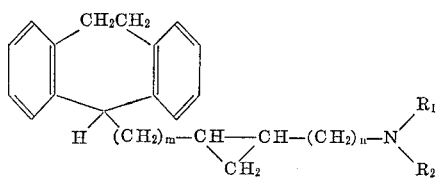

in which:

*m* and *n* each represent an integer of from 0 to 1; and $R_1$ and $R_2$ are lower alkyl of from 1 to 3 carbon atoms.

3. A chemical compound of the formula:

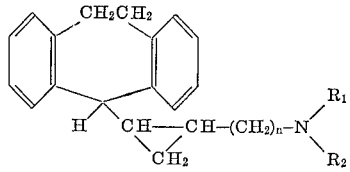

in which:

*n* is a positive integer of from 0 to 1; and $R_1$ and $R_2$ are lower alkyl of from 1 to 3 carbon atoms.

4. A chemical compound of the formula:

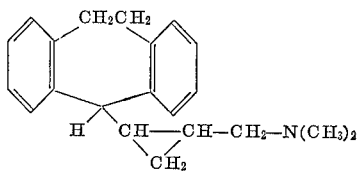

5. A chemical compound of the formula:

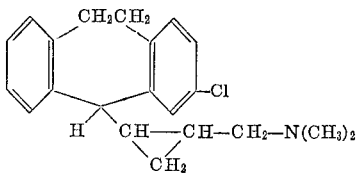

6. A chemical compound of the formula:

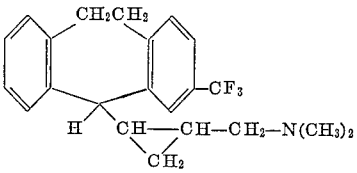

7. A chemical compound of the formula:

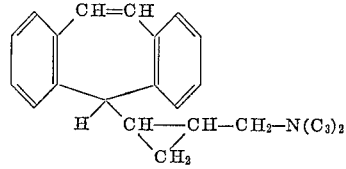

8. Trans - 5 - [2-(N,N-dimethylaminomethyl)-cyclopropyl]-10,11-dihydro-5H-dibenzo[a,d]cycloheptene.

References Cited

UNITED STATES PATENTS

| | | |
|---|---|---|
| 3,335,133 | 8/1967 | Kaiser et al. _____ 260—239 |
| 3,272,864 | 9/1966 | Hoffsommer et al. __ 260—570.8 |
| 3,354,206 | 11/1967 | Wendlen et al. __ 260—570.8 X |

OTHER REFERENCES

Winthrop et al., J. Org. Chem., vol. 27 (1962), pp. 230–34.

ALEX MAZEL, *Primary Examiner.*

D. G. DANS, *Assistant Examiner.*

U.S. Cl. X.R.

260—268, 293, 294, 294.7, 326.81, 515, 516, 520, 558, 559, 563, 590, 668, 679

PO-1050
(5/69)

UNITED STATES PATENT OFFICE
CERTIFICATE OF CORRECTION

Patent No. 3,449,427        Dated June 10, 1969

Inventor(s) Carl Kaiser and Charles L. Zirkle

It is certified that error appears in the above-identified patent and that said Letters Patent are hereby corrected as shown below:

Column 3, lines 9 to 10, that portion of the left-hand formula reading

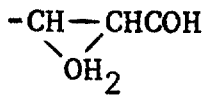        should read        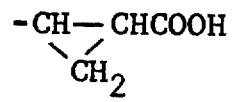

Column 3, line 12, the formula should read as follows --$R_1OH$--; lines 19 to 20, that portion of the left-hand formula reading

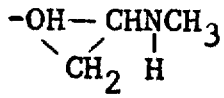        should read        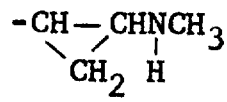

Column 4, line 12, the formula should read as follows --$R_1MgX$--.

Column 12, lines 51 to 54, that portion of the formula reading

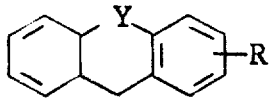        should read        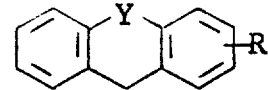

Column 14, lines 24 to 25, that portion of the formula reading

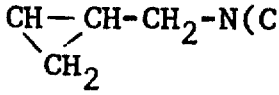 should read        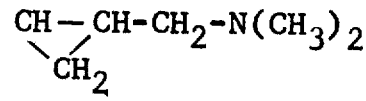

SIGNED AND
SEALED
MAR 10 1970

(SEAL)
Attest:

Edward M. Fletcher, Jr.
Attesting Officer

WILLIAM E. SCHUYLER, JR.
Commissioner of Patents